US011008800B2

(12) United States Patent
Begin et al.

(10) Patent No.: US 11,008,800 B2
(45) Date of Patent: May 18, 2021

(54) SECONDARY WINDOW

(71) Applicant: Alpen High Performance Products, Inc., Louisville, CO (US)

(72) Inventors: Brad Begin, Niwot, CO (US); Robert Clarke, Niwot, CO (US)

(73) Assignee: ALPEN HIGH PERFORMANCE PRODUCTS, INC., Louisville, CO (US)

(*) Notice: Subject to any disclaimer, the term of this patent is extended or adjusted under 35 U.S.C. 154(b) by 0 days.

(21) Appl. No.: 16/424,726

(22) Filed: May 29, 2019

(65) Prior Publication Data

US 2019/0368263 A1    Dec. 5, 2019

Related U.S. Application Data

(60) Provisional application No. 62/771,968, filed on Nov. 27, 2018, provisional application No. 62/677,641, filed on May 29, 2018.

(51) Int. Cl.
*E06B 3/28* (2006.01)
*E06B 3/58* (2006.01)
*C03C 3/083* (2006.01)

(52) U.S. Cl.
CPC ........... *E06B 3/28* (2013.01); *C03C 3/083* (2013.01); *E06B 3/58* (2013.01); *C03C 2201/32* (2013.01); *E05Y 2900/148* (2013.01)

(58) Field of Classification Search
CPC ... E06B 3/28; E06B 3/30; E06B 3/308; E06B 3/50

USPC ............................................................ 52/202
See application file for complete search history.

(56) References Cited

U.S. PATENT DOCUMENTS

| | | | | |
|---|---|---|---|---|
| 3,971,178 A | * | 7/1976 | Mazzoni | E06B 3/5418 52/172 |
| 4,208,849 A | * | 6/1980 | Lamb | E06B 3/5418 52/203 |
| 4,619,973 A | * | 10/1986 | Smith, Jr. | B32B 17/10018 260/DIG. 31 |
| 5,737,885 A | | 4/1998 | Stoyke | |
| 5,806,256 A | * | 9/1998 | Byrne | E06B 3/08 52/204.5 |
| 6,012,257 A | * | 1/2000 | Caplette | B60J 1/2094 52/202 |

(Continued)

FOREIGN PATENT DOCUMENTS

| CH | 597489 A5 | * 4/1978 | ............... E06B 3/28 |
|---|---|---|---|
| CN | 101592015 A | * 12/2009 | |

(Continued)

*Primary Examiner* — Christine T Cajilig
(74) *Attorney, Agent, or Firm* — Lathrop GPM LLP

(57) ABSTRACT

A secondary window includes a first glazing, a film, and a first frame. The first glazing includes a glass substrate having a thickness, between a first glazing surface opposite a second glazing surface, less than 2.0 millimeters. The film is attached to the first glazing surface. The first glazing is secured in the first frame, which at least partially surrounds the glazing. A second secondary window includes a second glazing secured in a second frame, which at least partially surrounds the second glazing. The second glazing includes (a) a first pane having a first-pane thickness less than 2.0 millimeters and (b) a second pane having a second-pane thickness that exceeds the first-pane thickness.

19 Claims, 8 Drawing Sheets

(56) References Cited

U.S. PATENT DOCUMENTS

| | | | | |
|---|---|---|---|---|
| 9,222,299 B2 * | 12/2015 | Haak | ................. | E06B 5/11 |
| 2004/0111986 A1 * | 6/2004 | Zurhaar | ................. | B32B 17/10 |
| | | | | 52/202 |
| 2005/0166496 A1 * | 8/2005 | Farag | ................. | B32B 17/10 |
| | | | | 52/204.57 |
| 2007/0199259 A1 * | 8/2007 | Parsley | ................. | E06B 3/28 |
| | | | | 52/203 |
| 2007/0248756 A1 * | 10/2007 | Krisko | ................. | C03C 17/002 |
| | | | | 427/255.15 |
| 2010/0215916 A1 * | 8/2010 | Perrin | ................. | B32B 17/10293 |
| | | | | 428/192 |
| 2012/0094084 A1 * | 4/2012 | Fisher | ................. | B32B 17/10761 |
| | | | | 428/174 |
| 2013/0312594 A1 * | 11/2013 | Bertolini | ................. | B32B 17/10761 |
| | | | | 89/36.02 |
| 2016/0136929 A1 * | 5/2016 | Meiss | ................. | C03C 21/002 |
| | | | | 428/213 |
| 2016/0333633 A1 * | 11/2016 | Carrick | ................. | E06B 3/28 |
| 2019/0112220 A1 * | 4/2019 | Alder | ................. | C03C 3/087 |

FOREIGN PATENT DOCUMENTS

| | | | | |
|---|---|---|---|---|
| DE | 2836389 A1 * | 2/1980 | ............ | E06B 3/6707 |
| FR | 2286941 A1 * | 4/1976 | ............ | E06B 3/28 |
| WO | WO-8204279 A1 * | 12/1982 | ............ | E06B 3/28 |
| WO | WO-2014190381 A1 * | 12/2014 | ............ | E06B 3/28 |

* cited by examiner

SECONDARY WINDOW

CROSS-REFERENCE TO RELATED APPLICATIONS

This application claims priority to U.S. provisional patent application Ser. No. 62/677,641, filed on May 29, 2018, and U.S. provisional patent application Ser. No. 62/771,968, filed on Nov. 27, 2018, the disclosures of which are incorporated herein by reference in their entirety.

BACKGROUND

Many older commercial and residential buildings still have their original single-pane windows, which provide far inferior thermal insulation compared to new replacement windows. While single-pane windows increase heating and/or cooling costs for such buildings, replacing the single-pane windows with newer energy-efficient windows can be cost-prohibitive. For example, recouping the cost of new windows with lower energy bills may take decades. Furthermore, replacing original windows may be undesirable for aesthetic reasons, e.g., for historical buildings, for which building codes may also prohibit modification of the building's external appearance.

Secondary windows, also known as window inserts, provide an alternative to window replacement. A secondary window may be installed adjacent to the interior side of a building's existing window, which is known as a primary window. Many tall single-glazed buildings cannot be retrofit with a second pane of standard-width glass due to civil engineering limitations, structural limitations, and weight limitations. Other problems with existing secondary windows include: fragility, requirement of thick perimeter framing, high cleaning costs, and relatively high coefficients of thermal expansion, which results in poor surface-flatness that distorts visible scenes outside of the window.

DETAILED DESCRIPTION OF THE EMBODIMENTS

Figure 1:
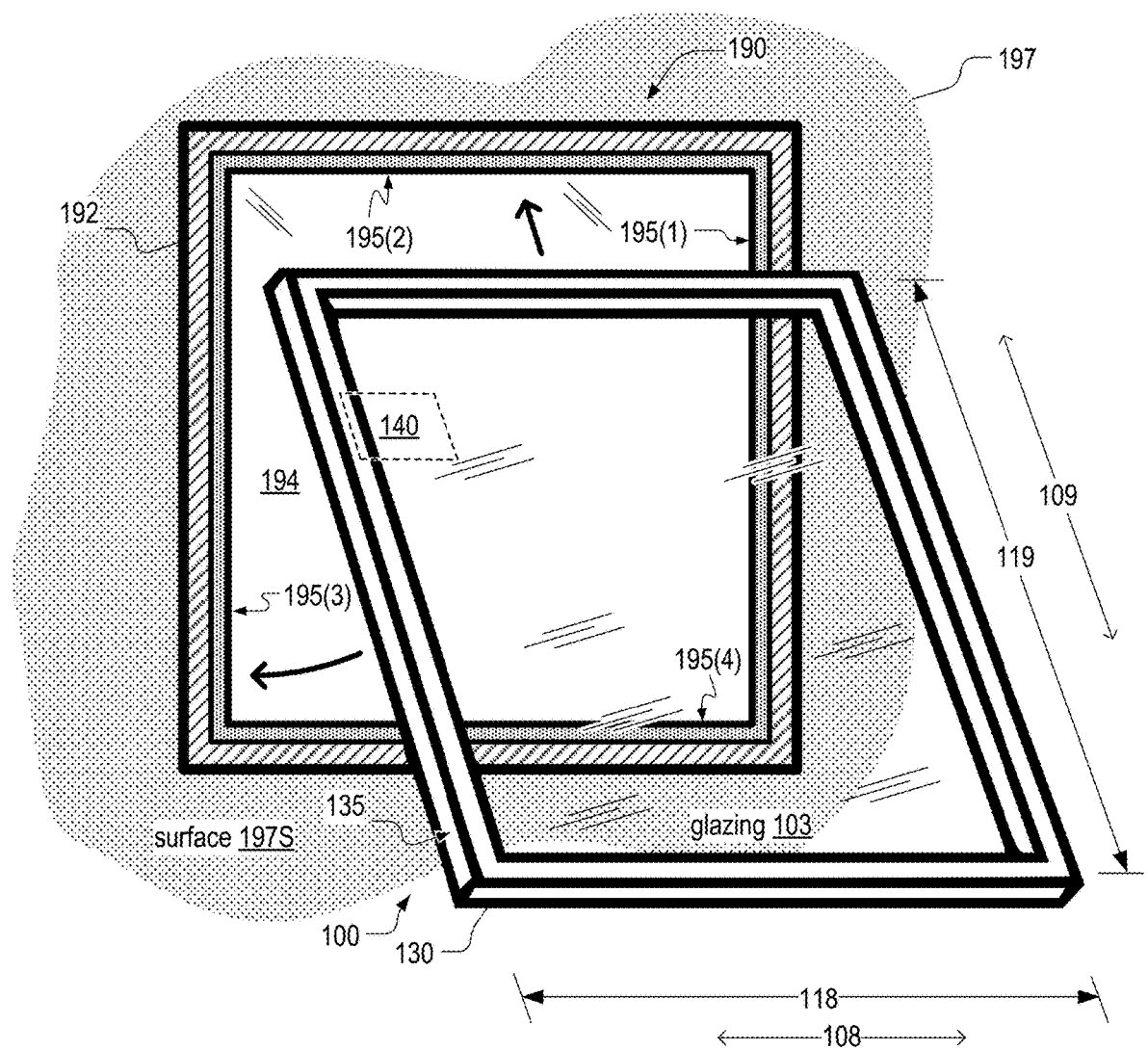
FIG. 1 is a schematic of a secondary window configured to fit on or within a frame of a primary window, in an embodiment.

FIG. 1 is a schematic of a secondary window 100 configured to fit on or within a frame 192 of a primary window 190. Primary window 190 includes a glazing 194 and is surrounded by a wall 197 of a building. Secondary window 100 includes a glazing 103 secured in a frame 130, which at least partially surrounds glazing 103. Frame 192 includes jambs 195(1-4), surfaces of which are oblique to, or perpendicular to, a plane of glazing 194. In embodiments, glazing 103 is a sloped glazing or an overhead glazing.

Glazing 103 has a width 118 and a height 119, each of which may exceed two hundred fifty centimeters. In certain embodiments, height 119 is at least three hundred centimeters.

Frame 130 may be formed of any one or more of fiberglass, vinyl, aluminum, plastic, wood, a wood composite, and a composite thereof. Frame 130 may be at least partially filled with an insulating material, such as an aerogel. Frame 130 includes a side surface 135 that surrounds glazing 103. Side surface 135 may be configured to be a mating surface with at least a surface of one jamb 195 of frame 192.

In embodiments, frame 130 has a low-emissivity coating on at least one of its interior-facing surface, facing primary window 190, and exterior-facing surface, facing away from primary window 190. The Low-emissivity coating may be a paint or a film.

Secondary window 100 may also be configured to be a primary window of wall 197. Wall 197 includes a surface 197S, which may be either an exterior surface or an interior surface. When surface 197S is an exterior surface, secondary window 100 may function as a storm window associated with primary window 190. When surface 197S is an interior surface, surface 197S may be a surface of a drywall panel and secondary window 100 may function as a secondary window or window insert.

Secondary window 100 may include a mechanical access 140 configured to enable removal of water vapor trapped by glazing 103 when fit on or within a frame 192. Mechanical access 140 may be part of at least one of glazing 103 and frame 130, and may include a gasket and/or a valve. Mechanical access 140 may enable at least part of glazing 103 to be removably attached to frame 130. Mechanical access 140 may enable, e.g., by including one or more hinges connecting glazing 103 to frame 130, at least part of glazing 103 to swing out from frame 130.

Figure 2:
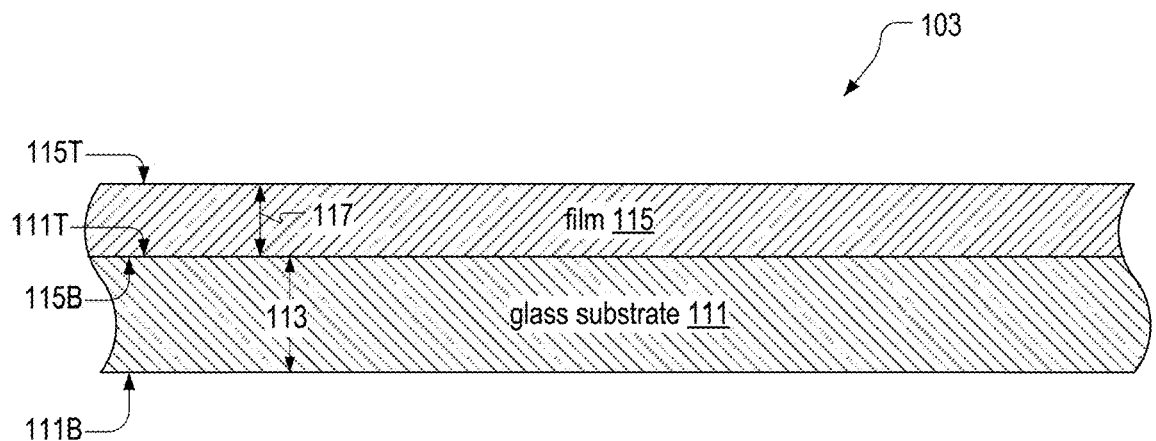
FIG. 2 is a schematic cross-sectional view of a glazing of the secondary window of FIG. 1, in an embodiment.

FIG. 2 is a schematic cross-sectional view of glazing 103, which includes a film 115 on a glass substrate 111. The aforementioned high thermal-expansion coefficient of existing secondary windows is particularly a deficiency of suspended-film secondary windows. Glass substrate 111 remedies this deficiency by providing a rigid substrate (glass substrate 111) for film 115. In an embodiment, secondary window 100 includes a second glass substrate, such that film 115 is between glass substrate 111 and the second glass substrate. The second glass substrate may be similar to or identical to glass substrate 111.

Glass substrate 111 has a first substrate surface 111B and a second substrate surface 111T, which are separated by a glass thickness 113 of glass substrate 111. Film 115 has a first film surface 115B and a second film surface 115T, which are separated by a thickness 117 of film 115. Film 115 is attached to second substrate surface 111T such that first film surface 115B adjoins second substrate surface 111T. Film 115 may be adhesively bonded to glass substrate 111.

Thickness 117 of film 115 may be between 50 μm (0.05 mm) and 400 μm (0.4 mm), and may depend on the function of film 115. Security films tend to be thicker than tint films, for example. Thickness 117 may be outside of the aforementioned range without departing from the scope of the present embodiments.

FIG. 1 denotes axes 108 and 109, with respect to secondary window 100, corresponding to directions of width 118 and height 119 of glazing 103, respectively. Axis 108 may be perpendicular to axis 109. Width 118 may equal a width, parallel to axis 108, of glass substrate 111. Height 119 may equal a height, parallel to axis 109, of glass substrate 111.

In embodiments, glass substrate 111 includes at least one of the following types of glass, which enables glazing 103 to be sufficiently resistant to damage such as cracking: annealed glass, chemically strengthened glass, and an aluminosilicate glass. For example, glass substrate 111 may be one of a Corning® Gorilla® Glass by Corning Incorporated, a Dragontrail™ glass by Asahi Glass Co., Ltd, and a SCHOTT Xensation™ glass by Schott Corporation. Glass substrate 111 may be a float glass, such as Microwhite™ by Pilkington. Glass substrate 111 may be a soda-lime glass, such as Pilkington's NSG UFF™ or a low-iron glass, such as Pilkington's NSG Glanova™. Glass substrate 111 may have at least one of the following properties, which are also indicative of the aforementioned damage resistance: a compressive stress exceeding 650 MPa, a depth of layer exceeding fifty micrometers, a four-point bending strength exceeding 800 MPa.

In embodiments, at least one of film 115 and glass substrate 111 is transparent to visible light. For example, at least one of film 115 and glass substrate 111 (e.g., the glass forming substrate 111) may transmit a higher percentage of electromagnetic radiation at a visible wavelength, between 0.4 μm and 0.75 μm, than (a) light having a shorter wavelength (ultraviolet light) and/or (b) light having a longer wavelength (infrared light).

The thickness 113 of glass substrate 111 substantially determines the weight and manufacturing cost of secondary window 100. In embodiments, glass thickness 113 is less than 1.5 millimeters. Without departing from the scope of the present embodiments, glass thickness 113 may exceed 0.3 millimeters and be less than 2.0 millimeters. Glass thickness 113 may be between 2.0 millimeters and 5.0 millimeters, for example, when excess weight and associated cost is not a significantly limiting factor.

Glass substrate 111 has an area A equal to the product of width 118 and height 119. In embodiments, the ratio of $\sqrt{A}$ to glass thickness 113 exceeds one thousand. In embodiments, when area A is between forty-five and fifty-five square feet (4.2-5.1 square meters), the ratio of $\sqrt{A}$ to glass thickness 113 exceeds 2,900. For conventional annealed (non-tempered) glass, typical values of this ratio range from approximately three hundred to four hundred.

A 1.5-millimeter thickness corresponds to a weight reduction exceeding 75% Compared to common architectural glass having a 6.35-millimeter thickness (¼-inch). Energy required manufacture glass, e.g., to melt sand, is also a significant cost driver. A 0.7-millimeter thickness corresponds to an energy-cost reduction exceeding 88% compared to common architectural glass having a 5.7-millimeter thickness. This cost savings corresponds to an increase of window-area utilization (glazing area divided by monetary cost) that exceeds a factor of eight. When secondary window 100 includes one and only one glass substrate 111, the manufacturing costs such a secondary window 100 is far less than a secondary window that includes two relatively thick glass substrates.

In embodiments, film 115 includes at least one of a spectrally-selective film, heat-control window film, an ultraviolet-blocking window film, a low-emissivity film, a glare-control window film, a privacy film, a tint film, a decorative film, a safety/security film, a soundproofing film, a photovoltaic film, an electrochromic film, a photochromic film, and a thermochromic film. At least part of film 115 may be, or be configured to function as, a daylight-redirecting film. Film 115 may be formed of a polymer, a metal, a ceramic, or a combination thereof, and may be a single-layer or a multi-layer film.

Figure 3:
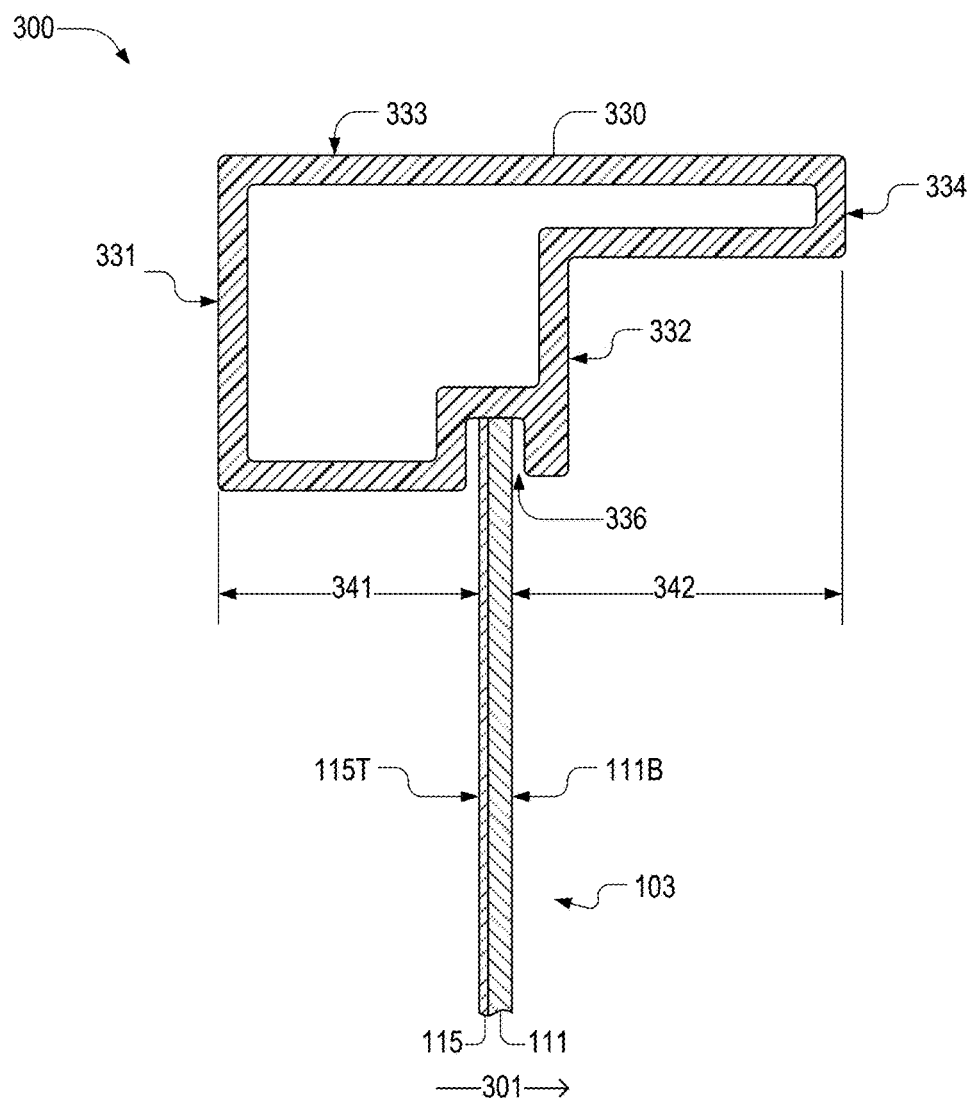
FIG. 3 is a schematic of a cross-sectional view illustrating part of a secondary window, which is an example of the secondary window of FIG. 1, in an embodiment.

FIG. 3 is a schematic cross-sectional view illustrating part of a secondary window 300, which is an example of secondary window 100. Secondary window 300 includes glazing 103 and a frame 330, which is an example of frame 130.

Frame 330 includes at least one of frame surfaces 331-334. FIG. 3 illustrates glazing 103 in frame 330 such that film 115 is proximate frame surface 331 and glass substrate 111 is proximate frame surface 332. Without departing from the scope of the present embodiments, glazing 103 may be secured in frame 330 such that film 115 is proximate frame surface 334 and glass substrate 111 is proximate frame surface 331. In a direction 301, surfaces 331 and 334 are separated from glazing 103 by respective distances 341 and 342. Direction 301 may be perpendicular to at least one of surfaces 111B and 115T. Secondary window 300 may include additional glazings, similar to and parallel to glazing 103, such that it is a multiple-pane window.

Frame 330 may include a groove 336, into which glazing 103 may fit. Alternatively, glazing 103 may rest on, or be secured to, an interior surface of frame 330, such as surface 332 between surfaces 331 and 334. Glazing 103 may be secured to frame 330 by at least one of a glazing bead and a glazing gasket. At least one of surfaces 331 and 334 may be parallel to surface 115T and/or surface 11B of glazing 103. Surfaces 332 and 334 are separated by a distance 343, which may equal zero such that surface 332 and 332 are at least one of coplanar and a single surface.

Figure 4:
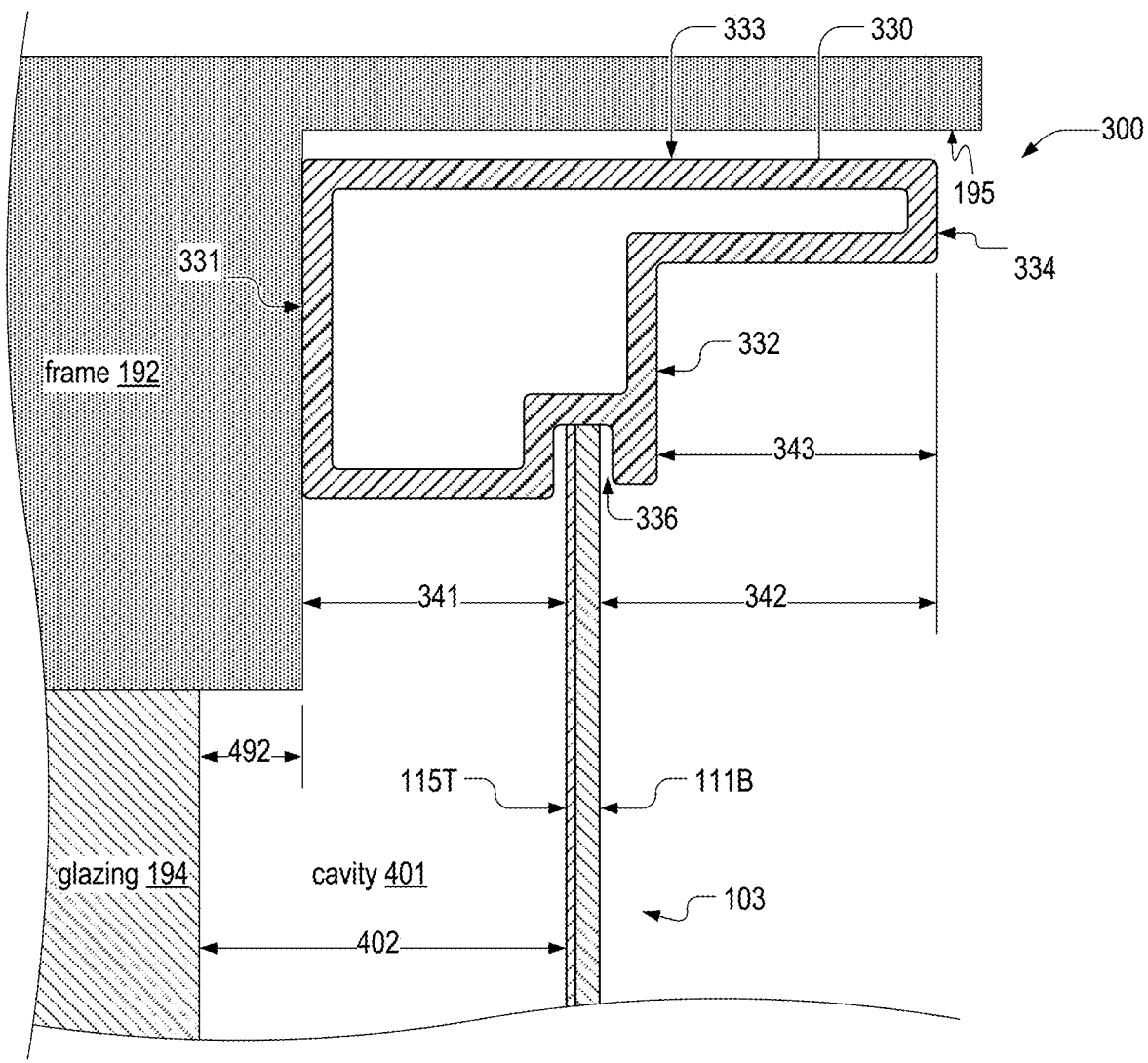
FIG. 4 illustrates secondary window of FIG. 3 configured to function as a window insert attached to the primary window of FIG. 1, in an embodiment.

FIG. 4 illustrates secondary window 300 configured to function as a window insert attached to primary window 190. Jamb 195 illustrated in FIG. 4 may be any of jambs 195(1-4) shown in FIG. 1. At least one of frame surfaces 331-333 may function as mating surfaces when frame 330 is attached to frame 192 of primary window 190. For example, the attachment may involve just one mating surface, such as (a) surface 331 as illustrated in FIG. 4, (b) surface 334 when secondary window 300 is flipped, or (c) surface 333. Alternatively, the attachment may involve a pair two mating surfaces, such as surfaces 331 and 333 or surfaces 334 and 333. Surface 333 may be attached to jamb 195.

Frame 330 may be configured to maintain a cavity 401 between primary glazing 190 and glazing 103. Cavity 401 has, along direction 301, a cavity width 402. Frame 330 may be configured such that cavity width 402 corresponds to an optimal distance that minimizes net heat transfer between glazing 194 and 103 via both conduction and convection. Acoustic insulation may also be a factor in determining optimal value of cavity width 402. Cavity width 402 is, for example, between eight millimeters and twenty millimeters. Cavity width 402 exceeds distance 341 by a distance 492 determined by the geometry of frame 192. When distance 492 is known, frame 330 may be designed such that distance 341 (or distance 342) equals the difference between cavity width 402 and distance 492, where cavity width 402 is the aforementioned optimal width.

FIG. 4 illustrates glazing 103 in frame 330 such that film 115 is between glazing 194 and glass substrate 111. Without departing from the scope of the present embodiments, glazing 103 may be secured in frame 330 such that glass substrate 111 is between glazing 194 and film 115.

Figure 5:
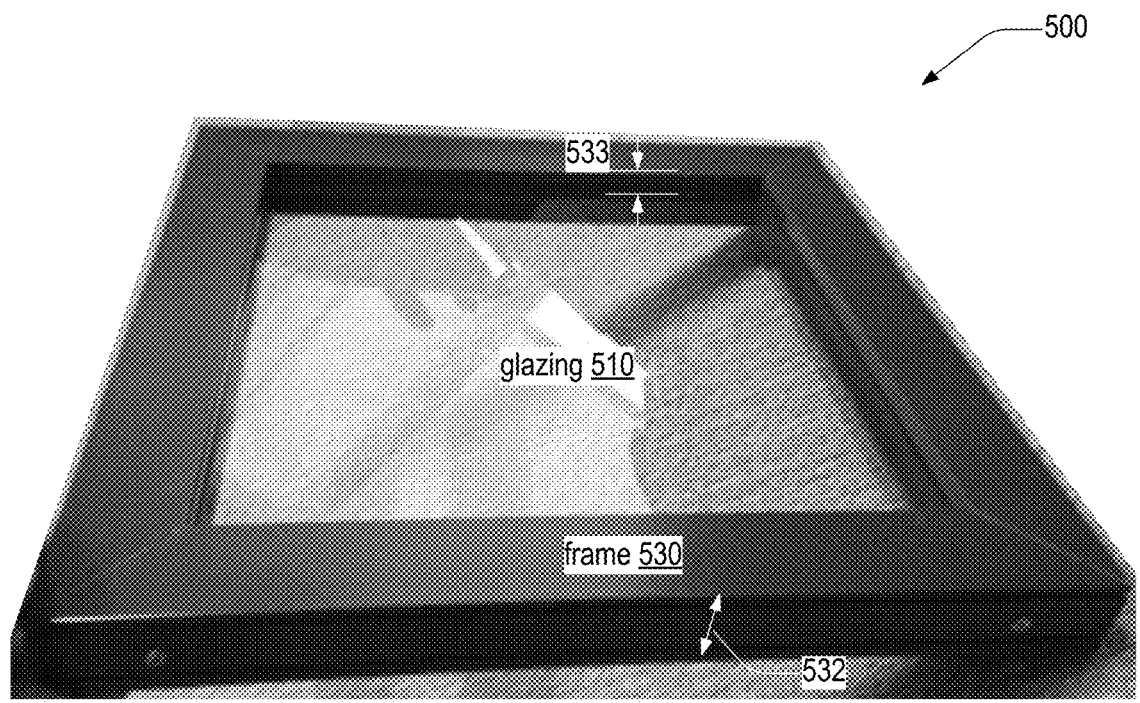
FIGS. 5 and 6 are photographs of a front side and back side, respectively, of a prototype secondary window, which is an embodiment of secondary window of FIG. 1.
Figure 6:
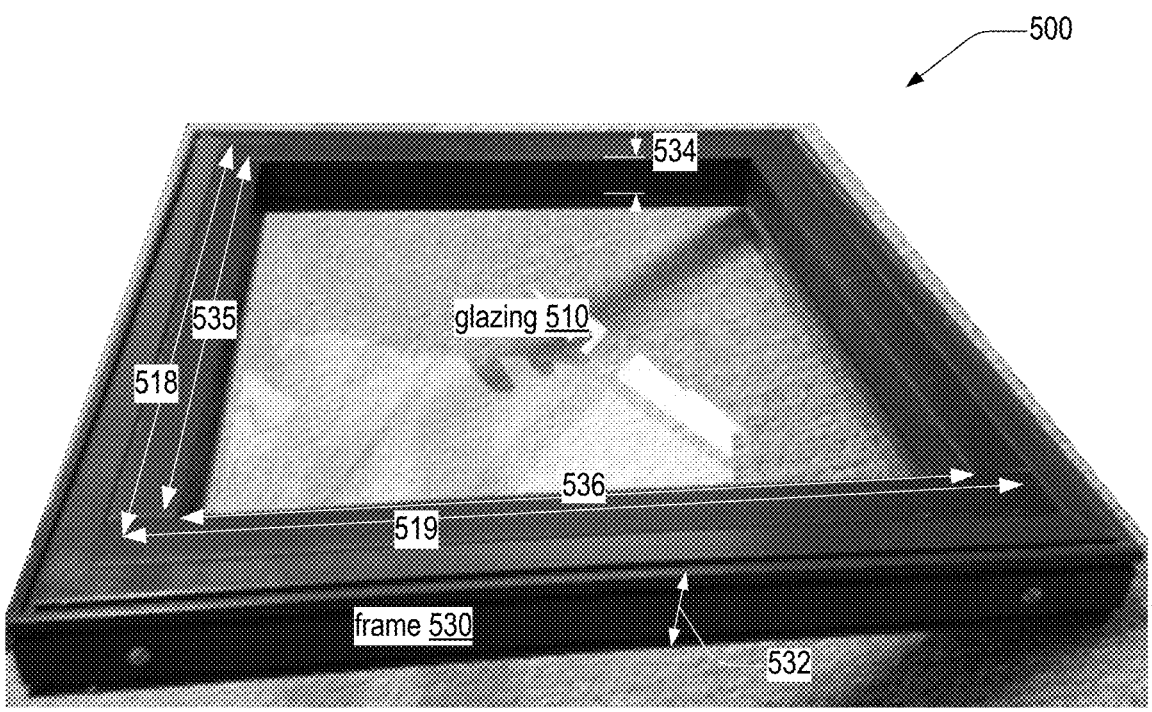

FIGS. 5 and 6 are photographs of a front side and back side, respectively, of a prototype secondary window 500, which is an embodiment of secondary window 100. Prototype secondary window 500 includes a glazing 510 secured in a frame 530, which are examples of glazing 103 and frame 130, respectively. Frame 530 has an outer-thickness 532 equal to 35.0±0.5 mm, a top inner-thickness 533 equal to 9.0±0.5 mm, and a bottom inner thickness 534 equal to 24.0±0.5 mm. Frame 530 has an inner width 535 and an inner height 536, which equal 283±0.5 mm and 284±0.5 mm respectively. Glazing 510 has a width 518 and a height 519 that exceed inner width 535 and inner height 536, respectively. Widths 518 and 519 are examples of widths 118 and 119, respectively.

Figure 7:
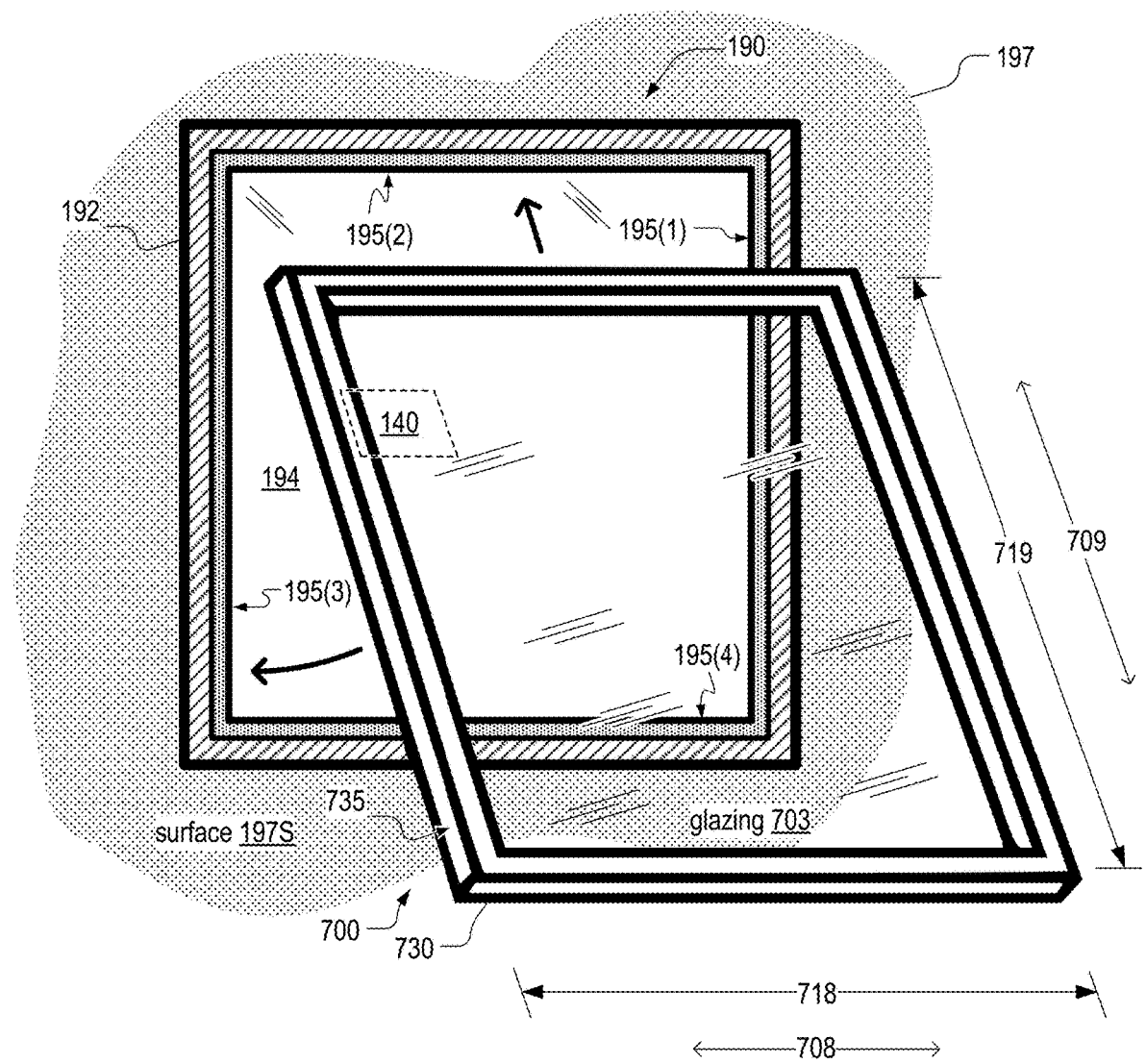
FIG. 7 is a schematic of a secondary window configured to fit on or within a frame of a primary window, in an embodiment.

FIG. 7 is a schematic of a secondary window 700 configured to fit on or within frame 192 of primary window 190 introduced in FIG. 1. Secondary window 700 includes a glazing 703 secured in a frame 730, which at least partially surrounds glazing 703. Glazing 703 has width 118 and height 119. Secondary window 700, glazing 703, and frame 730 are respective examples of secondary window 100, glazing 103, and frame 130, FIG. 1. In embodiments, glazing 703 is a sloped glazing or an overhead glazing.

Frame 730 may be formed of any one or more of fiberglass, vinyl, aluminum, plastic, wood, a wood composite, and a composite thereof. Frame 730 may be at least partially filled with an insulating material, such as an aerogel. Frame 730 includes a side surface 735 that surrounds glazing 703. Side surface 735 may be configured to be a mating surface with at least a surface of one jamb 195 of frame 192.

Secondary window 700 may also be configured to be a primary window of wall 197. When surface 197S of wall 197 is an exterior surface, secondary window 700 may function as a storm window associated with primary window 190. When surface 197S is an interior surface, surface 197S may be a surface of a drywall panel and secondary window 700 may function as a secondary window or window insert.

Secondary window 700 may include a mechanical access 740 configured to enable removal of water vapor trapped by glazing 703 when fit on or within a frame 192. Mechanical access 740 may be part of at least one of glazing 703 and frame 730, and may include a gasket and/or a valve. Mechanical access 740 may enable at least part of glazing 703 to be removably attached to frame 730.

Figure 8:
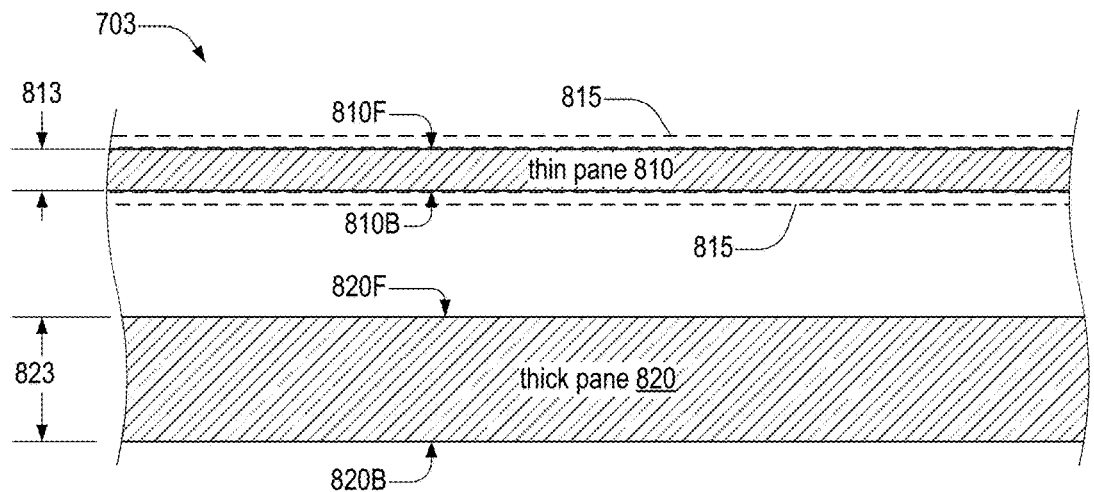
FIG. 8 is a schematic cross-sectional view of a glazing of the secondary window of FIG. 1, in an embodiment.

FIG. 8 is a schematic cross-sectional view of glazing 703, which includes a thin pane 810 and a thick pane 820. Glazing 703 may include one or more additional panes, for example, a pane similar to and parallel to thin pane 810. Mechanical access 740 may enable, e.g., by including one or more hinges connecting glazing 703 to frame 730, at least part of glazing 703, e.g., pane 810 or 820, to swing out from frame 730.

Thin pane 810 is an example of glass substrate 111. Thin pane 810 has a first substrate surface 810B and a second substrate surface 810F, which are separated by a glass thickness 813 of thin pane 810. Thick pane 820 has a first substrate surface 820B and a second substrate surface 820F, which are separated by a glass thickness 823 of thick pane 820. Glass thickness 823 may exceed glass thickness 813.

Glass thickness 823 may be between three millimeters and six millimeters. Glass thickness 823 may be other thicknesses without departing from the scope hereof.

FIG. 7 denotes axes 708 and 709, with respect to secondary window 700, corresponding to directions of width 718 and height 719 of glazing 703, respectively. Axis 708 may be perpendicular to axis 709. Width 718 may equal a width, parallel to axis 708, of one or both of thin pane 810 and thick pane 820. Height 719 may equal a height, parallel to axis 709, of one or both of thin pane 810 and thick pane 820. Along axis 708, thin pane 810 may have a width that equals a width of thick pane 820. Similarly, along axis 709, thin pane 810 may have a height that equals a height of thick pane 820.

Thick pane 820 may include at least one of the following types of glass: annealed glass, tempered glass, heat-strengthened glass, chemically strengthened glass, and laminated glass. Thick pane 820 may include a coating thereon, such as a low-emissivity coating and/or a decorative coating.

Thin pane 810 may include at least one of the following types of glass, which enables glazing 703 to be sufficiently resistant to damage such as cracking: annealed glass, chemically strengthened glass, and an aluminosilicate glass. For example, thin pane 810 may include one of a Corning® Gorilla® Glass by Corning Incorporated, a Dragontrail™ glass by Asahi Glass Co., Ltd, and a SCHOTT Xensation™ glass by Schott Corporation. Thin pane 810 may include a float glass, such as Microwhite™ by Pilkington. Thin pane 810 may include a soda-lime glass, such as Pilkington's NSG UFF™ or a low-iron glass, such as Pilkington's NSG Glanova™. Thin pane 810 may have at least one of the following properties, which are also indicative of the aforementioned damage resistance: a compressive stress exceeding 650 MPa, a depth of layer exceeding fifty micrometers, a four-point bending strength exceeding 800 MPa.

Thin pane 810 may be transparent to visible light. For example, by virtue of the material that forms thin pane 810, thin pane 810 may transmit a higher percentage of electromagnetic radiation at a visible wavelength, between 0.4 μm and 0.75 μm, than (a) light having a shorter wavelength (ultraviolet light) and/or (b) light having a longer wavelength (infrared light).

Thickness 813 of thin pane 810 substantially determines the weight and manufacturing cost of secondary window 700. Glass thickness 813 may be less than glass thickness 823. For example, in one embodiment, glass thickness 813 is less than 1.5 millimeters. Without departing from the scope of the present embodiments, glass thickness 813 may range from 0.3 millimeters to 2.5 millimeters. Glass thickness 813 may be between 2.5 millimeters and 5.0 millimeters, for example, when excess weight and associated cost is not a significantly limiting factor.

Thin pane 810 may include a thin film 815 on either or both of surfaces 810F and 810B for enhancing one or both of safety and performance of secondary window 700. Thin film 815 may be a laminated thin film. Thin film 815 may be at least one of a spectrally-selective film, heat-control window film, an ultraviolet-blocking window film, a low-emissivity film, a glare-control window film, a privacy film, a tint film, a decorative film, a safety/security film, a soundproofing film, a photovoltaic film, an electrochromic film, a photochromic film, and a thermochromic film. At least part of the thin may be, or be configured to function as, a daylight-redirecting film. Thin film 815 may be formed of a polymer, a metal, a ceramic, or a combination thereof, and may be a single-layer or a multi-layer film.

A thickness of film 815 may be between 50 µm (0.05 mm) and 400 µm (0.4 mm), and may depend on the function of film 815. Security films tend to be thicker than tint films, for example. The thickness may be outside of the aforementioned range without departing from the scope of the present embodiments.

Figure 9:
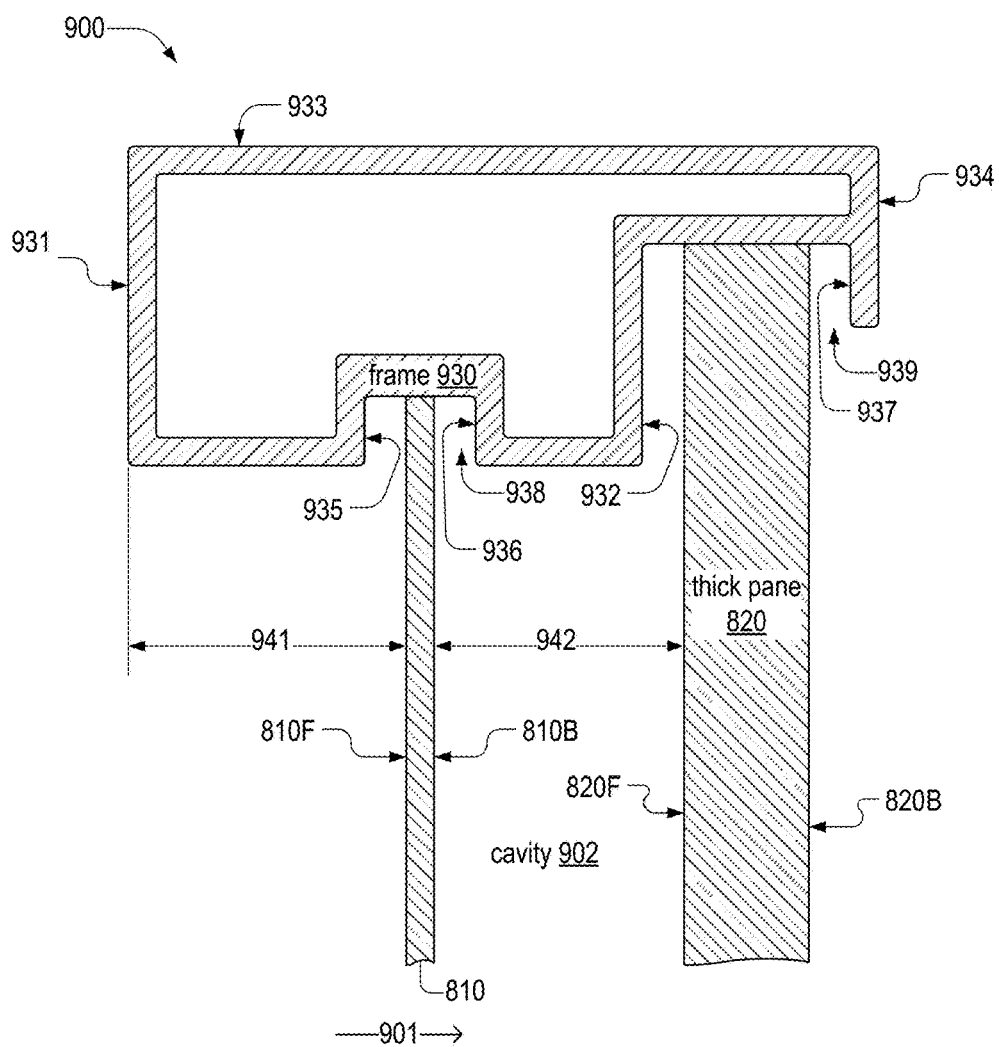
FIG. 9 is a schematic of a cross-sectional view illustrating part of a secondary window, which is an example of the secondary window of FIG. 7, in an embodiment.

FIG. 9 is a schematic cross-sectional view illustrating part of a secondary window 900, which is an example of secondary window 700. Secondary window 900 includes a frame 930 and glazing 703, represented by thin pane 810 and thick pane 820. Frame 930 is an example of frame 730 and includes at least one of frame surfaces 931-937.

Frame 930 may include a groove 938, into which thin pane 810 may fi. Groove 938 is defined in part by surfaces 935 and 936. Thin pane 810 may rest on, or be secured to, an interior surface of frame 930, such as surface 935 and/or 936. Thin pane 810 may be secured to frame 930 by at least one of a glazing bead and a glazing gasket. At least one of surfaces 931 and 934 may be parallel to surface 810F and/or surface 810B of thin pane 810.

Frame 930 may include a groove 939, into which thick pane 820 may fit. Groove 939 is defined in part by surfaces 932 and 937. Thick pane 820 may rest on, or be secured to, an interior surface of frame 930, such as surface 932 and/or 937. Thick pane 820 may be secured to frame 930 by at least one of a glazing bead and a glazing gasket.

In a direction 901, surfaces 810F and 931 are separated by a distance 941. Surfaces 820F and 810B are separated by a distance 942 in direction 901. Direction 901 may be perpendicular to at least one of surfaces 810B, 810F, 820B, and 820F. Distance 941 is, for example, between ten millimeters and fifty millimeters. Distance 942 is, for example between six millimeters and fourteen millimeters.

Distance 942 may be a thickness of a cavity 902 bounded by thin pane 810, thick pane 820, and frame 930. Cavity 902 may be hermetically sealed, and may include an inert gas such as argon and krypton, which increases the thermal insulation properties of secondary window 900. When cavity 902 is hermetically sealed, secondary window 900 may function as an insulating glass unit configured to be fitted to the interior of an existing window, such as primary window 190.

Figure 10:
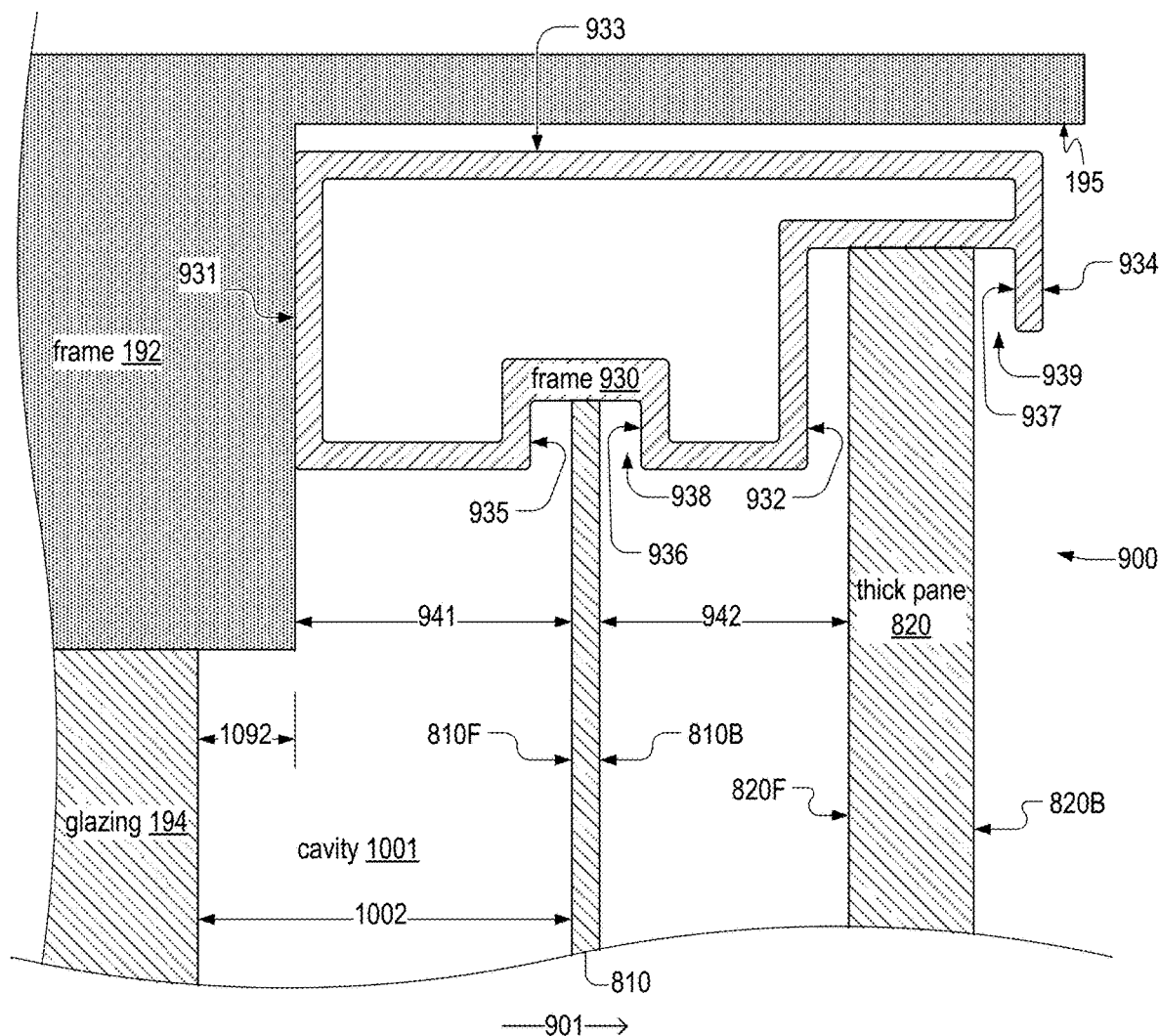
FIG. 10 illustrates the secondary window of FIG. 9 configured to function as a window insert attached to the primary window of FIG. 7, in an embodiment.

FIG. 10 illustrates secondary window 900 configured to function as a window insert attached to primary window 190. Jamb 195 illustrated in FIG. 10 may be any of jambs 195(1-4) shown in FIG. 7. At least one of frame surfaces 931, 933, 934 may function as mating surfaces when frame 930 is attached to frame 192 of primary window 190. For example, the attachment may involve just one mating surface, such as (a) surface 931 as illustrated in FIG. 10, (b) surface 934 when secondary window 900 is flipped, or (c) surface 933. Alternatively, the attachment may involve a pair two mating surfaces, such as surfaces 931 and 933 or surfaces 934 and 933. Surface 933 may be attached to jamb 195.

Frame 930 may be configured to maintain a cavity 1001 between primary glazing 190 and glazing 703. Cavity 1001 has, along direction 901, a cavity width 1002. Frame 930 may be configured such that cavity width 1002 corresponds to an optimal distance that minimizes net heat transfer between glazing 194 and thin plane 810 via both conduction and convection. Acoustic insulation may also be a factor in determining optimal value of cavity width 1002. Cavity width 1002 is, for example, between eight millimeters and twenty millimeters. Cavity width 1002 exceeds distance 941 by a distance 1092 determined by the geometry of frame 192. When distance 1092 is known, frame 930 may be designed such that distance 941 (or distance 942) equals the difference between cavity width 1002 and distance 1092, where cavity width 1002 is the aforementioned optimal width.

FIG. 10 illustrates glazing 703 in frame 930 such that thin pane 810 is between thick pane 820 and glazing 194. Without departing from the scope of the present embodiments, glazing 703 may be secured in frame 930 such that thick pane 820 is between glazing 194 and thin pane 810.

Figure 11:
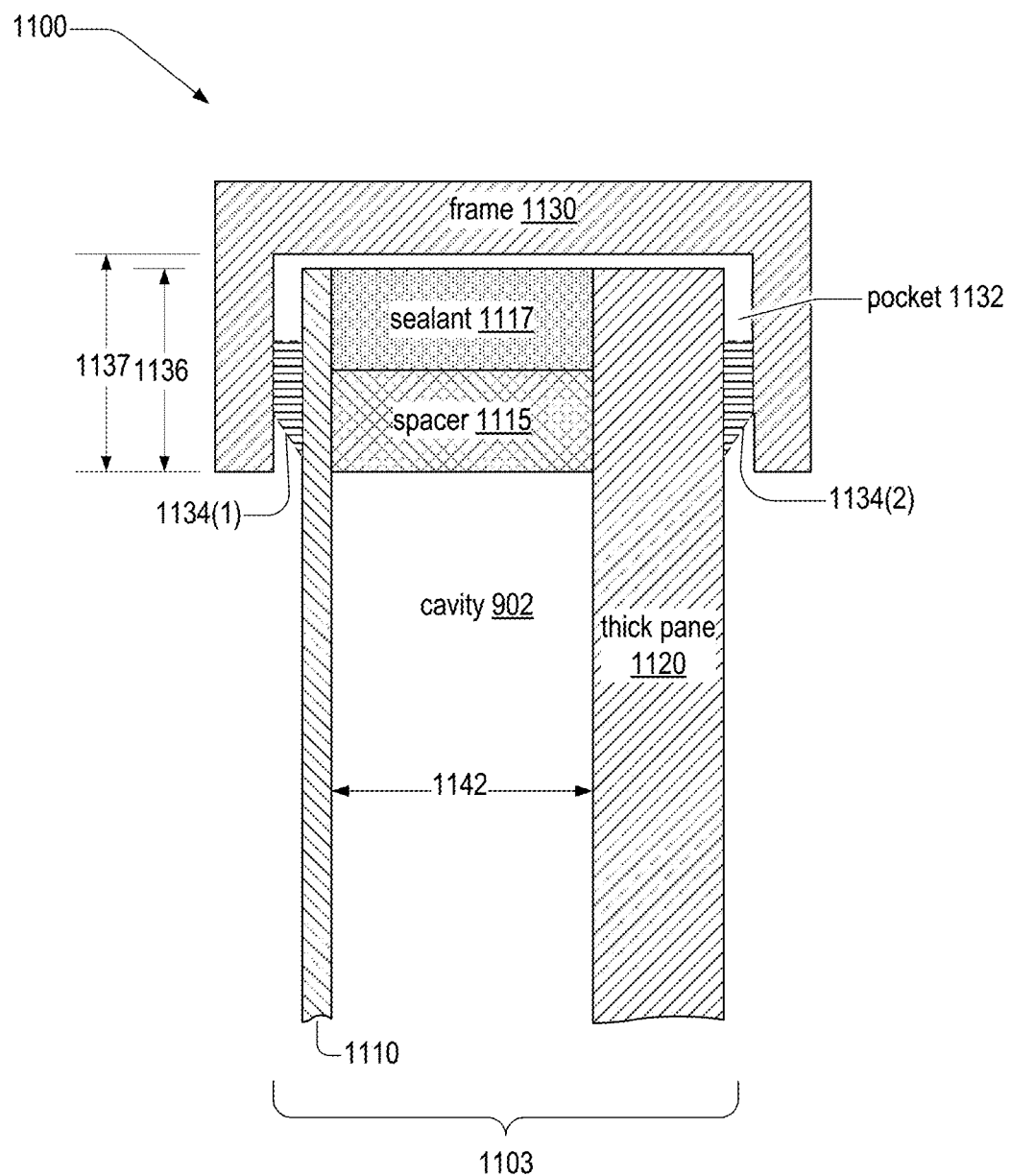
FIG. 11 is a schematic illustrating part of a secondary window, in an embodiment.

FIG. 11 is a cross-sectional schematic illustrating part of a secondary window 1100, which is an example of secondary window 700. Secondary window 1100 includes a glazing 1103 secured in a frame 1130. Glazing 1103 includes a thin pane 1110 and a thick pane 1120.

Glazing 1103, thin pane 1110, thick pane 1120, and frame 1130 are examples of glazing 103, thin pane 810, thick pane 820, and frame 730, respectively. Along axis 108, thin pane 1110 and thick pane 1120 may have the same width. Along axis 109, thin pane 1110 and thick pane 1120 may have the same height. Secondary window 1100 includes a rigid spacer 1115 and structural sealant 1117, each of which occupy a region between thin pane 1110 and thick pane 1120.

Secondary window 1100 may include one or more window gaskets 1134 between frame 1130 and glazing 1103. A first window gasket 1134(1) may be in contact with thin pane 1110, and a second window gasket 1134(2) may be in contact with thick pane 1120.

Thick pane 1110, spacer 1115, and thick pane 1120 form a cavity 1102, which is an example of cavity 902, FIG. 9. Cavity 1102 may be hermetically sealed, for example, by structural sealant 1117. Spacer 1115 may have a width, perpendicular to surfaces of panes 1110 and 1120, that defines a distance 1142 between thin pane 1110 and thick pane 1120. Distance 1142 is an example of distance 942, FIG. 9. Secondary window 1100 may include a desiccant for preventing or minimizing condensation in cavity 1102. The desiccant may be at least one of: (a) within cavity 1102, (b) between frame 1130 and glazing 1103, and (c) inside of, or at least partially surrounded by, spacer 1115, e.g., when spacer 1115 is hollow or includes a blind hole and/or a through hole.

When cavity 1102 is hermetically sealed, secondary window 1100 may function as an insulating glass unit configured to be fitted to the interior of an existing window, such as primary window 190.

Frame 1130 forms a single glazing pocket 1132 into which edges of glazing 1103 fit. Glazing 1103 extends a depth 1136 into glazing pocket 1132. Glazing pocket has a depth 1137, which is greater than or equal to depth 1136. Depth 1136 may be at least one-half inch (12.7 mm), which enables frame 1130 to sufficiently support and/or protect at least one of spacer 1115, sealant 1117, and the desiccant such that secondary window 1100 functions as an insulating glass unit for window 190. In an embodiment, depth 1136 is greater than or equal to %16" (14.3 mm). Frame 1130 may include one or more holes to function as venting to allow for air circulation between primary window 190 and secondary window 1100.

Changes may be made in the above secondary windows without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present secondary window, which, as a matter of language, might be said to fall therebetween.

What is claimed is:

1. A secondary window comprising:
   a glazing including a glass substrate having a glazing thickness less than 1.5 millimeters between a first glazing surface opposite a second glazing surface;
   a laminated thin film attached to the first glazing surface and having a film thickness between 0.05 mm and 0.4 mm; and
   a fiberglass frame at least partially surrounding the glazing, the glazing being secured therein, the fiberglass frame being filled with an insulation material,
   wherein in a region of a cross-sectional plane perpendicular to the first glazing surface and not including the frame, a total thickness of the secondary window is a sum of the glazing thickness and the film thickness.

2. The secondary window of claim 1, the glass substrate being annealed.

3. The secondary window of claim 1, the glass substrate being formed of an aluminosilicate glass.

4. The secondary window of claim 1, the glass substrate having a compressive stress exceeding 800 MPa.

5. The secondary window of claim 1, the glass substrate having a depth of layer exceeding fifty micrometers.

6. The secondary window of claim 1, the glass substrate having a four-point bending strength exceeding 800 MPa.

7. The secondary window of claim 1, one of the glazing and the frame including a valve configured to enable removal of water vapor trapped by the secondary window.

8. The secondary window of claim 1, the frame having a first frame surface, proximate the film, and a second frame surface proximate the second glazing surface, and being configured to secure the glazing such that a gap distance between either (a) the film and the first frame surface, and (b) the second glazing surface and the second frame surface, is between ten millimeters and fifteen millimeters.

9. The secondary window according to claim 8, being configured to function as a window insert attached to a primary window and either (a) the film located between a primary glazing of the primary window and the glazing, or (b) the film located on a surface of the glazing opposite the primary window.

10. The secondary window according to claim 9, either (a) when the gap distance is between the film and the first frame surface, the first frame surface being configured to attach to a frame of the primary window, or (b) when the gap distance is between the second glazing surface and the second frame surface, the second frame surface being configured to attach to the frame of the primary window.

11. The secondary window of claim 1, the frame being configured to attach adjacent to a primary window of a building, such that the secondary window functions as a storm window of the primary window; wherein a cavity width between a primary glazing of the primary window, and either the film or the glazing is between 8 and 20 millimeters.

12. The secondary window of claim 1, the frame being configured to attach to an inside surface of a primary window of a building, such that the secondary window functions as a window insert of the primary window.

13. A secondary window comprising:
    a glazing including (a) a first pane having a first thickness less than 1.5 millimeters, an area A equal to a product of a width and a height of the glazing, a ratio of $\sqrt{A}$ to the glazing thickness exceeding one thousand, and (b) a second pane having a second thickness that exceeds the first thickness; and
    a secondary frame at least partially surrounding the glazing, the glazing being secured therein, the secondary frame comprising insulation-filled fiberglass.

14. The secondary window of claim 13, the glazing including a laminated thin film attached to the first pane and having a film thickness between 0.05 mm and 0.4 mm.

15. The secondary window of claim 13, the secondary frame being configured to fit within a primary frame of a primary window of a building, the secondary frame differing from the primary frame, such that the secondary window functions as a window insert of the primary window.

16. The secondary window of claim 1, the glazing having an area A equal to a product of a width and a height of the glazing, a ratio of $\sqrt{A}$ to the glazing thickness exceeding one thousand.

17. The secondary window of claim 16, the ratio of $\sqrt{A}$ to the glazing thickness exceeding 2,900.

18. The secondary window of claim 13, the ratio of $\sqrt{A}$ to the glazing thickness exceeding 2,900.

19. The secondary window of claim 1, the film being a single-layer film.

* * * * *